US012809568B2

(12) United States Patent
Park et al.

(10) Patent No.: US 12,809,568 B2
(45) Date of Patent: Nov. 24, 2026

(54) MODULAR DISPLAY DEVICE AND MANUFACTURING METHOD OF SAME

(71) Applicant: Samsung Electronics Co., Ltd., Suwon-si (KR)

(72) Inventors: Jinyong Park, Suwon-si (KR); Sunghyun Yoo, Suwon-si (KR); Jaehee Lim, Suwon-si (KR); Minju Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 19/320,553

(22) Filed: Sep. 5, 2025

(65) Prior Publication Data

US 2026/0169670 A1 Jun. 18, 2026

Related U.S. Application Data

(63) Continuation of application No. PCT/KR2025/012857, filed on Aug. 22, 2025.

(30) Foreign Application Priority Data

Dec. 17, 2024 (KR) ........................ 10-2024-0189049

(51) Int. Cl.
*G06F 3/14* (2006.01)

(52) U.S. Cl.
CPC .................................. *G06F 3/1446* (2013.01)

(58) Field of Classification Search
CPC ..................................................... G06F 3/1446
See application file for complete search history.

(56) References Cited

U.S. PATENT DOCUMENTS

| | | | | |
|---|---|---|---|---|
| 8,508,432 | B2 | 8/2013 | Shim et al. | |
| 10,147,392 | B2 | 12/2018 | Jung et al. | |
| 10,541,279 | B2 * | 1/2020 | An | G06F 3/0412 |
| 10,621,907 | B2 | 4/2020 | Yang et al. | |
| 11,176,865 | B2 | 11/2021 | Beon et al. | |
| 2002/0080302 | A1 * | 6/2002 | Dubin | G02F 1/13336 349/73 |

(Continued)

FOREIGN PATENT DOCUMENTS

| | | |
|---|---|---|
| CN | 107562398 | 1/2018 |
| CN | 111724693 | 9/2020 |

(Continued)

OTHER PUBLICATIONS

Search Report and Written Opinion dated Dec. 15, 2025 issued in International Patent Application No. PCT/KR2025/012857.

*Primary Examiner* — Dmitriy Bolotin
(74) *Attorney, Agent, or Firm* — Nixon & Vanderhye, P.C.

(57) ABSTRACT

A modular display device includes a plurality of display modules. The display modules are arranged such that a difference between a first optical characteristic value and a second optical characteristic value of each of the display modules changes gradually (e.g., at a specified rate or less). The first optical characteristic value is measured when each of the display modules displaying a reference image is viewed in a first direction. The second optical characteristic value is measured when each of the display modules displaying the reference image is viewed in a second direction different from the first direction.

20 Claims, 9 Drawing Sheets

(56) References Cited

U.S. PATENT DOCUMENTS

| | | | | |
|---|---|---|---|---|
| 2005/0174309 | A1* | 8/2005 | Bouwens | G09G 3/32 345/83 |
| 2015/0186099 | A1* | 7/2015 | Hall | G06F 3/1438 345/1.3 |
| 2019/0103048 | A1* | 4/2019 | Kwon | G09G 5/18 |
| 2022/0238079 | A1* | 7/2022 | Yu | G09G 3/3426 |
| 2024/0203327 | A1* | 6/2024 | Thielemans | G09G 3/2003 |
| 2025/0015060 | A1* | 1/2025 | Carlson | G09G 3/32 |
| 2026/0048317 | A1* | 2/2026 | Brown | A63B 71/0669 |
| 2026/0092813 | A1* | 4/2026 | Lian | G01J 3/506 |

FOREIGN PATENT DOCUMENTS

| | | | |
|---|---|---|---|
| CN | 119007588 | | 11/2024 |
| JP | 2017-125952 | | 7/2017 |
| KR | 100775202 | B1 | 11/2007 |
| KR | 20150054452 | A | 5/2015 |
| KR | 101551882 | B1 | 9/2015 |
| KR | 10-2551907 | | 7/2023 |
| KR | 102555953 | B1 | 7/2023 |
| KR | 102686185 | B1 | 7/2024 |

* cited by examiner

MODULAR DISPLAY DEVICE AND MANUFACTURING METHOD OF SAME

CROSS-REFERENCE TO RELATED APPLICATIONS

This application is a continuation of International Application No. PCT/KR2025/012857 designating the United States, filed on Aug. 22, 2025, in the Korean Intellectual Property Receiving Office and claiming priority to Korean Patent Application No. 10-2024-0189049, filed on Dec. 17, 2024, in the Korean Intellectual Property Office, the disclosures of each of which are incorporated by reference herein in their entireties.

BACKGROUND

Field

The disclosure relates to a modular display device and a manufacturing method thereof.

Description of Related Art

A modular display device may include a plurality of display modules capable of being combined in various sizes and forms. The plurality of display modules may form one integrated screen by being coupled to each other. Each of the plurality of display modules may operate independently or display content together with another module.

SUMMARY

According to an example embodiment, a modular display device may comprise: a plurality of display modules, wherein the plurality of display modules may be arranged such that a respective difference between a first optical characteristic value and a second optical characteristic value for each of the plurality of display modules changes at a specified rate or less. The first optical characteristic value may be measured when each of the plurality of display modules displaying a reference image is viewed in a first direction. The second optical characteristic value may be measured when each of the plurality of display modules displaying the reference image is viewed in a second direction different from the first direction.

In an example embodiment, an angle between the first direction and the second direction may be equal to or greater than 45 degrees and less than 90 degrees.

In an example embodiment, the first direction may be perpendicular to a screen of each of the plurality of display modules displaying the reference image.

In an example embodiment, the second direction may face the screen of each of the plurality of display modules and may be inclined with respect to the first direction.

In an example embodiment, the first optical characteristic value and the second optical characteristic value may include a chromaticity value.

In an example embodiment, the first optical characteristic value and the second optical characteristic value may include a chromaticity value of white.

In an example embodiment, the first optical characteristic value and the second optical characteristic value may include a chromaticity value of green.

In an example embodiment, the first optical characteristic value and the second optical characteristic value may include a luminance value.

In an example embodiment, the plurality of display modules may include a first set of display modules arranged in sequence along a first specific direction. The first set of display modules may include first and second display modules positioned at opposite ends of the first specific direction, and a third display module positioned between the first and second display modules. A difference of first and second optical characteristic values of the third display module may be greater than the difference of the first and second optical characteristic values of the first display module and less than the difference of the first and second optical characteristic values of the second display module.

In an example embodiment, the plurality of display modules may have a matrix arrangement, and the first specific direction may be a diagonal direction of the matrix arrangement.

In an example embodiment, the plurality of display modules may include a fourth display module, a fifth display module, and a sixth display module, which are arranged in sequence along a second specific direction and are adjacent to each other. The difference of the first and second optical characteristic values of the fifth display module may be greater than the difference of first and second optical characteristic values of the fourth display module and the difference of first and second optical characteristic values of the sixth display module.

In an example embodiment, the first specific direction may be parallel to the second specific direction.

In an example embodiment, the first specific direction may be different from the second specific direction. The fourth display module, the fifth display module, or the sixth display module may be included in the first set of display modules.

In an example embodiment, the plurality of display modules may include a seventh display module, an eighth display module, and a ninth display module, which are arranged in sequence along a third specific direction and are adjacent to each other. The difference of first and second optical characteristic values of the eighth display module may be less than the difference of first and second optical characteristic values of the seventh display module and the difference of first and second optical characteristic values of the ninth display module.

According to an example embodiment, a method of manufacturing a modular display device including a plurality of display modules may comprise: measuring, in a respective first direction, a first optical characteristic value for each of the plurality of display modules displaying a reference image, measuring, in a respective second direction different from the respective first direction, a second optical characteristic value for each of the plurality of display modules displaying the reference image, determining an arrangement of the plurality of display modules such that a respective difference between the first optical characteristic value and the second optical characteristic value for each of the plurality of display modules changes at a specified rate or less, and assembling the plurality of display modules in the determined arrangement.

In an example embodiment, the first optical characteristic value may include a first chromaticity value of a designated color along a first axis of a color coordinate system. The second optical characteristic value may include a second chromaticity value of the designated color along the first axis of the color coordinate system.

In an example embodiment, the first optical characteristic value may include a third chromaticity value of the designated color along a second axis of the color coordinate system. The second optical characteristic value may include a fourth chromaticity value of the designated color along the second axis of the color coordinate system. The method of manufacturing may further comprise determining an arrangement of the plurality of display modules such that a respective first difference between the first and second chromaticity values for each of the plurality of display modules changes at a specified rate or less, determining whether a deviation of a respective second difference between the third and fourth chromaticity values among adjacent display modules within the determined arrangement exceeds a reference value, and assembling the display modules in the determined arrangement based on the deviation not exceeding the reference value.

In an example embodiment, the method of manufacturing may further comprise replacing at least some of the display modules determined to exceed the reference value with other display modules for assembly if the deviation exceeds the reference value.

In an example embodiment, the respective first direction may be perpendicular to a screen of each of the plurality of display modules displaying the reference image.

In an example embodiment, the respective second direction may face the screen of each of the plurality of display modules and may be inclined with respect to the respective first direction.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
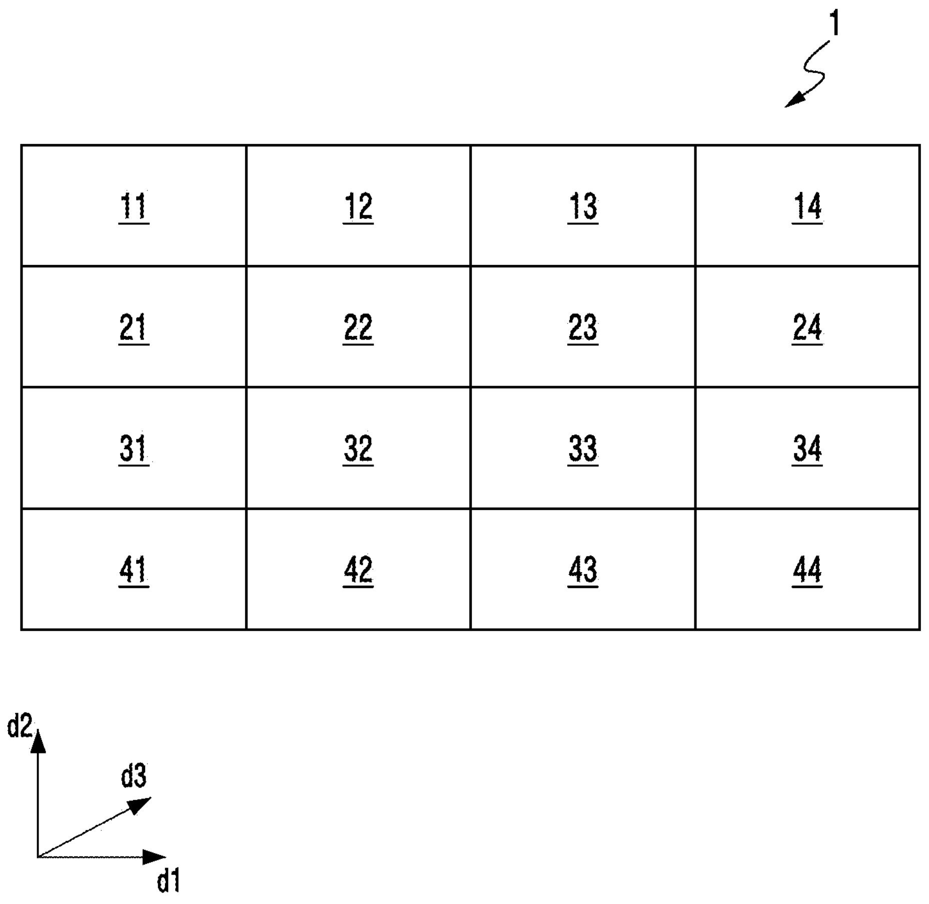
FIG. 1 is a diagram illustrating a front view of a modular display device, according to various embodiments.

Hereinafter, various example embodiments are described in greater detail with reference to the accompanying drawings. Various example embodiments described in the present disclosure may be variously modified. Example embodiments may be depicted in the drawings and may be described in detail in the detailed description. However, the example embodiments disclosed in the accompanying drawings is solely for the purpose of facilitating the understanding of the various embodiments. Therefore, the technical idea is not limited by the various example embodiments disclosed in the accompanying drawings, and should be understood to include all equivalents or substitutes included in the spirit and the technical scope of the present disclosure.

In the present disclosure, terms including ordinal numbers such as “first,” “second,” and the like, may be used to describe various components, but these components are not limited by the above-described terms. The above-described terms are used for the purpose of distinguishing one component from another.

In the present disclosure, terms such as “include”, “have”, and the like are intended to specify the presence of a feature, number, step, operation, component, part, or combination thereof described in the disclosure, and should not be understood to preclude the possibility of the presence or addition of one or more other features, numbers, steps, operations, components, parts, or combinations thereof.

When a component is referred to as being “connected” or “coupled” to another component, it should be understood that it may be directly connected or coupled to the other component, but also that one or more intervening components may be present. When a component is referred to as being “directly connected” or “directly coupled” to another component, it should be understood that no intervening components are present in between.

In the present disclosure, the term “identical” (or “the same”) may include not only a perfect match but also variations that fall within manufacturing tolerances.

In describing the present disclosure, if it is determined that a detailed description of a related known function or configuration may unnecessarily obscure the essence of the present disclosure, such detailed description may be abbreviated or omitted.

In the drawings, the same or similar components may be assigned the same reference numerals. Unless otherwise specified, the description for components having the same reference numerals may be applied identically or correspondingly even when referencing different drawings, and redundant descriptions for components having the same reference numerals may not be repeated. In the following description referring to a specific drawing, reference numerals from another drawing may be referred to.

Hereinafter, various example embodiments of the present disclosure are described in greater detail with reference to the accompanying drawings. However, a the present disclosure may be implemented in various different forms and is not limited to the various embodiments of the present disclosure described herein.

Figure 2:
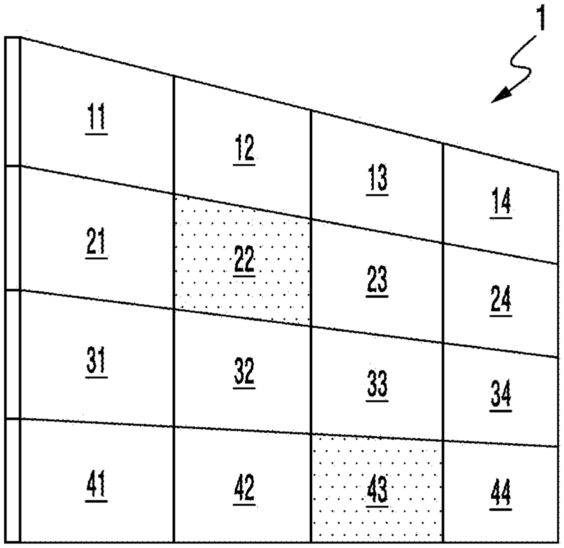
FIG. 2 is a perspective view of a modular display device, according to various embodiments.

FIG. 1 is a diagram illustrating a front view of a modular display device, according to various embodiments. FIG. 2 is a perspective view of a modular display device, according to various embodiments.

Referring to FIGS. 1 and 2, a modular display device 1 may include a plurality of display modules. Each of the plurality of display modules may be configured to operate independently. In addition, the plurality of display modules may be configured to be integrated with each other to function as a larger single display. The modular display device 1, which includes the plurality of display modules, may be applied, for example, and without limitation, to a display device such as a personal computer (PC) monitor, a TV, digital signage, an electronic display, and the like.

Each of the display modules may include a display panel having an inorganic light emitting diode for image display. For example, the display panel may include a plurality of inorganic light emitting diodes (e.g., micro LEDs) of approximately 100 μm or less. The micro LED may be a semiconductor chip (e.g., a micro LED chip) capable of emitting light by itself when power is supplied. As a non-limiting example, the micro LED may have a flip chip structure in which an anode electrode and a cathode electrode are formed on the same surface, and a light emitting surface is positioned on an opposite side of the surface in which the anode electrode and the cathode electrode are formed. Each of the plurality of display modules of the modular display device 1 may be referred to as a display panel or a display device.

Each of the plurality of display modules of the modular display device 1 may include a substrate. The substrate may include a glass substrate, a substrate of a synthetic resin series (e.g., polyimide (PI), polyethylene terephthalate (PET), polyether sulfone (PES), polyethylene naphthalate (PEN), or polycarbonate (PC)) having a flexibility material, or a ceramic substrate.

The micro-LEDs may be mounted on the substrate. In addition, thin film transistor (TFT) circuitry for driving the micro-LED (or pixels formed by the micro-LED) may be formed on the substrate. In addition, a data driving driver, a gate driving driver, and a timing controller for controlling each driving driver may be disposed on the substrate. Alternatively, at least one of the data driving driver, the gate driving driver, and the timing controller may be formed on another substrate electrically connected to the substrate.

The plurality of display modules of the display device 1 may be arranged in a designated form. For example, the plurality of display modules of the display device 1 may include display modules 11, 12, 13, 14, 21, 22, 23, 24, 31, 32, 33, 34, 41, 42, 43, and 44 configuring a 4×4 matrix arrangement.

For example, display modules 11, 12, 13, and 14 may be arranged in sequence along a first direction d1. The display modules 11, 12, 13, and 14 may define a first row of the matrix arrangement.

For example, display modules 21, 22, 23, and 24 may be arranged in sequence along the first direction d1. The display modules 21, 22, 23, and 24 may define a second row of the matrix arrangement.

For example, display modules 31, 32, 33, and 34 may be arranged in sequence along the first direction d1. The display modules 31, 32, 33, and 34 may define a third row of the matrix arrangement.

For example, display modules 41, 42, 43, and 44 may be arranged in sequence along the first direction d1. The display modules 41, 42, 43, and 44 may define a fourth row of the matrix arrangement.

For example, display modules 41, 31, 21, and 11 may be arranged in sequence along a second direction d2 perpendicular to the first direction d1. The display modules 41, 31, 21, and 11 may define a first column of the matrix arrangement.

For example, display modules 42, 32, 22, and 12 may be arranged in sequence along the second direction d2. The display modules 42, 32, 22, and 12 may define a second column of the matrix arrangement.

For example, display modules 43, 33, 23, and 13 may be arranged in sequence along the second direction d2. The display modules 43, 33, 23, and 13 may define a third column of the matrix arrangement.

For example, display modules 44, 34, 24, and 14 may be arranged in sequence along the second direction d2. The display modules 44, 34, 24, and 14 may define a fourth column of the matrix arrangement.

For example, display modules 21 and 12 may be arranged in sequence along a third direction d3. The third direction d3 may be a diagonal direction of the matrix arrangement. For example, the third direction d3 may be a direction between the first direction d1 and the second direction d2. For example, display modules 31, 22, and 11 may be arranged in sequence along the third direction d3. For example, display modules 41, 32, 23, and 14 may be arranged in sequence along the third direction d3. The display modules 41, 32, 23, and 14 may define a main diagonal of the matrix arrangement. For example, display modules 42, 33, and 24 may be arranged in sequence along the third direction d3. For example, display modules 43 and 34 may be arranged in sequence along the third direction d3.

As a non-limiting example, the display modules 11, 12, 13, 14, 21, 22, 23, 24, 31, 32, 33, 34, 41, 42, 43, and 44 may have substantially the same shape and/or size.

An arrangement of the plurality of display modules of the modular display device 1 is not limited by an illustrated example. For example, the plurality of display modules of the modular display device 1 may have a matrix arrangement of a different form, other than 4×4. For example, the modular display device 1 may include 81 display modules having a 9×9 matrix arrangement. For another example, the plurality of display modules of the modular display device 1 may have an irregular arrangement instead of a matrix arrangement.

Since characteristics of an LED and a TFT substrate for each grayscale level of each of the plurality of display modules of the modular display device 1 are different, an optical characteristic (e.g., luminance of R, G, B colors) of each of the display modules may differ after assembly of the plurality of display modules. In this case, the modular display device 1 may not appear as a single display.

To address this problem, a video for each grayscale level may be captured from a specific direction (e.g., a front surface of the modular display device 1), and corrected such that all display modules output the same or substantially the same color. However, when the corrected modular display device 1 is observed from the specific direction, it may appear as a single display, but when the modular display device 1 is observed from a direction (e.g., a side surface of the modular display device 1) different from the specific direction, images output by each of the plurality of display modules may not be uniform. For example, as illustrated in FIG. 2, display modules 22 and 43 may have a non-uniform optical characteristic compared to adjacent display modules. This can degrade uniformity of the modular display device 1, causing consumer dissatisfaction.

As such, an occurrence of a deviation in optical characteristics according to a viewing angle may be because a characteristic (light transmittance according to angle) of a film (e.g., anti-glare low-reflection (AGLR) film) included in each of the plurality of display modules are different from each other, and a LED light emitting efficiency according to angle is different from each other.

To address the problem described above, the plurality of display modules of the modular display device 1 may be arranged such that a difference (or a difference value) between a first optical characteristic value and a second optical characteristic value for each of the display modules gradually changes (e.g., changes at or less than a specified rate of change). For example, at least some of the plurality of display modules of the modular display device (1) may be arranged such that the difference between the first optical characteristic value and the second optical characteristic value of each of the display modules monotonically increases. For example, at least some of the plurality of display modules of the modular display device (1) may be arranged such that the difference between the first optical characteristic value and the second optical characteristic value of each of the display modules monotonically decreases. For example, some of the plurality of display modules of the modular display device (1) may be arranged such that the difference between the first optical characteristic value and the second optical characteristic value of each of the display modules monotonically increases, and the remaining some may be arranged such that the difference between the first optical characteristic value and the second optical characteristic value of each of the display modules monotonically decreases. For example, the plurality of display modules of the modular display device 1 may be arranged such that a difference in difference values between adjacent display modules is minimized and/or reduced.

The first optical characteristic value and the second optical characteristic value may each be measured for each of the plurality of display modules of the modular display device 1. The first optical characteristic value may be measured when each of the plurality of display modules is viewed in a first direction (e.g., a first direction D1 of FIG. 3), and the second optical characteristic value may be measured when each of the plurality of display modules is viewed in a second direction D2 (e.g., a second direction D2 of FIG. 3) different from the first direction.

For example, referring to FIG. 1, the difference value between the respective optical characteristic values (this may phrase may be abbreviated as "the difference value" herein) for each of the display modules 11, 12, 13, and 14 arranged along the first direction d1 may gradually change. For example, the difference value for each of the display modules 11, 12, 13, and 14 may gradually increase (or decrease) along the first direction d1. For example, the difference value for each of the display modules 11, 12, 13, and 14 may gradually increase (or decrease) and then decrease (or increase) along the first direction d1.

For example, the difference value for each of the display modules 21, 22, 23, and 24 arranged along the first direction d1 may gradually change. For example, the difference value for each of the display modules 21, 22, 23, and 24 may gradually increase (or decrease) along the first direction d1. For example, the difference value for each of the display modules 21, 22, 23, and 24 may gradually increase (or decrease) and then decrease (or increase) along the first direction d1.

For example, the difference value for each of the display modules 31, 32, 33, and 34 arranged along the first direction d1 may gradually change. For example, the difference value for each of the display modules 31, 32, 33, and 34 may gradually increase (or decrease) along the first direction d1. For example, the difference value for each of the display modules 31, 32, 33, and 34 may gradually increase (or decrease) and then decrease (or increase) along the first direction d1.

For example, the difference value for each of the display modules 41, 42, 43, and 44 arranged along the first direction d1 may gradually change. For example, the difference value for each of the display modules 41, 42, 43, and 44 may gradually increase (or decrease) along the first direction d1. In addition, in the first direction d1, the difference value of the display module 13 positioned between the display modules 12 and 14 may be greater than the difference value of the display module 12 and less than the difference value of the display module 14.

For example, the difference value for each of the display modules 41, 42, 43, and 44 may gradually increase (or decrease) and then decrease (or increase) along the first direction d1.

For example, the difference value for each of the display modules 41, 31, 21, and 11 arranged along the second direction d2 may gradually change. For example, the difference value for each of the display modules 41, 31, 21, and 11 may gradually increase (or decrease) along the second direction d2. For example, the difference value for each of the display modules 41, 31, 21, and 11 may gradually increase (or decrease) and then decrease (or increase) along the second direction d2.

For example, the difference value for each of the display modules 42, 32, 22, and 12 arranged along the second direction d2 may gradually change. For example, the difference value for each of the display modules 42, 32, 22, and 12 may gradually increase (or decrease) along the second direction d2. For example, the difference value for each of the display modules 42, 32, 22, and 12 may gradually increase (or decrease) and then decrease (or increase) along the second direction d2.

For example, the difference value for each of the display modules 43, 33, 23, and 13 arranged along the second direction d2 may gradually change. For example, the difference value for each of the display modules 43, 33, 23, and 13 may gradually increase (or decrease) along the second direction d2. For example, the difference value for each of the display modules 43, 33, 23, and 13 may gradually increase (or decrease) and then decrease (or increase) along the second direction d2.

For example, the difference value for each of the display modules 44, 34, 24, and 14 arranged along the second direction d2 may gradually change. For example, the difference value for each of the display modules 44, 34, 24, and 14 may gradually increase (or decrease) along the second direction d2. For example, the difference value for each of the display modules 44, 34, 24, and 14 may gradually increase (or decrease) and then decrease (or increase) along the second direction d2.

For example, the difference value for each of the display modules 21 and 12 arranged along the third direction d3 may gradually change. For example, the difference value for each of the display modules 21 and 12 may gradually increase (or decrease) along the third direction d3.

For example, the difference value for each of the display modules 31, 22, and 13 arranged along the third direction d3 may gradually change. For example, the difference value for each of the display modules 31, 22, and 13 may gradually increase (or decrease) along the third direction d3. For example, the difference value for each of the display modules 31, 22, and 13 may gradually increase (or decrease) and then decrease (or increase) along the third direction d3.

For example, the difference value for each of the display modules 41, 32, 23, and 14 arranged along the third direction d3 may gradually change. For example, the difference value for each of the display modules 41, 32, 23, and 14 may gradually increase (or decrease) along the third direction d3. For example, the difference value for each of the display modules 41, 32, 23, and 14 may gradually increase (or decrease) and then decrease (or increase) along the third direction d3.

For example, the difference value for each of the display modules 42, 33, and 24 arranged along the third direction d3 may gradually change. For example, the difference value for each of the display modules 42, 33, and 24 may gradually increase (or decrease) along the third direction d3. For example, the difference value for each of the display modules 42, 33, and 24 may gradually increase (or decrease) and then decrease (or increase) along the third direction d3.

For example, the difference value for each of the display modules 43 and 34 arranged along the third direction d3 may gradually change. For example, the difference value for each of the display modules 43 and 34 may gradually increase (or decrease) along the third direction d3.

Figure 3:
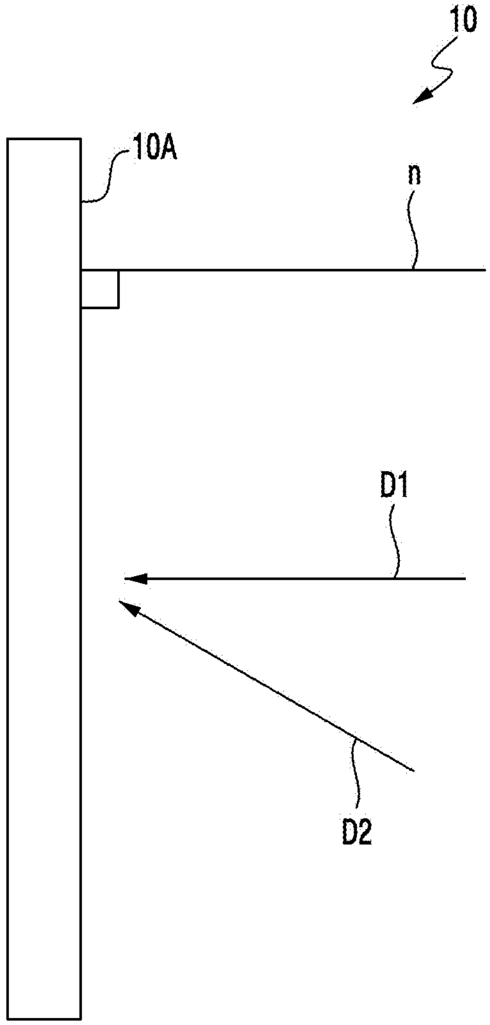
FIG. 3 is a diagram illustrating a direction for measuring an optical characteristic of a display module, according to various embodiments.

FIG. 3 is a diagram illustrating a direction for measuring an optical characteristic of a display module, according to various embodiments.

In FIG. 3, a display module 10 having a front surface 10A on which a screen is displayed is illustrated. A description of the display module 10 may apply substantially the same to each of the plurality of display modules of a modular display device 1.

Referring to FIG. 3, the first optical characteristic may be measured when the display module 10 (or the front surface 10A) displaying a reference image is viewed in a first direction D1.

The second optical characteristic may be measured when the display module 10 (or the front surface 10A) displaying the reference image is viewed in a second direction D2 different from the first direction D1.

As a non-limiting example, an angle between the first direction D1 and the second direction D2 may be equal to or greater than approximately 45 degrees and less than approximately 90 degrees. As a non-limiting example, the first direction D1 may be perpendicular to the display module 10 (or the front surface 10A). For example, a normal direction n of the front surface 10A and the first direction D1 may be parallel to each other.

The second direction D2 may face the front surface 10A and may be inclined with respect to the normal direction n. As a non-limiting example, an angle between the second direction D2 and the normal direction n may be equal to or greater than approximately 45 degrees and less than 90 degrees.

For example, the first optical characteristic value and the second optical characteristic value may include a chromaticity value. For example, the first optical characteristic value and the second optical characteristic value may include a chromaticity value of white. In this case, the reference image displayed by the display module 10 may be a white screen of a designated luminance (e.g., approximately 250 nit). For example, each of the first optical characteristic value and the second optical characteristic value may include the chromaticity value of white along a first axis (e.g., an x-axis) of a color coordinate system and/or the chromaticity value of white along a second axis (e.g., a y-axis) of the color coordinate system. The color coordinate system may include, as a non-limiting example, a commission internationale de l'Éclairage (CIE) 1931 color coordinate system.

The first optical characteristic value and the second optical characteristic value may include a chromaticity value of green. For example, each of the first optical characteristic value and the second optical characteristic value may include the chromaticity value of green along the first axis (e.g., the x-axis) of the color coordinate system and/or the chromaticity value of green along the second axis (e.g., the y-axis) of the color coordinate system.

The first optical characteristic value and the second optical characteristic value may include a luminance value.

In a comparative example, an arrangement of display modules of the modular display device 1 may be determined using only one of the first optical characteristic value or the second optical characteristic value. If the display modules are assembled in such a determined arrangement, an optical characteristic of each display module may vary according to a condition (e.g., temperature, voltage, and the like) and accordingly, uniformity of the modular display device 1 may be broken.

Since the difference value between the first optical characteristic value and the second optical characteristic value is an inherent characteristic of the LED and the film, it may not be affected by external factors such as temperature and voltage. Therefore, the modular display device 1 assembled in an arrangement determined based on the difference value may maintain the uniformity even after assembly. The modular display device 1 assembled in the arrangement determined based on the difference value may maintain the uniformity even when viewed in different directions (e.g., front and side).

Figure 4:
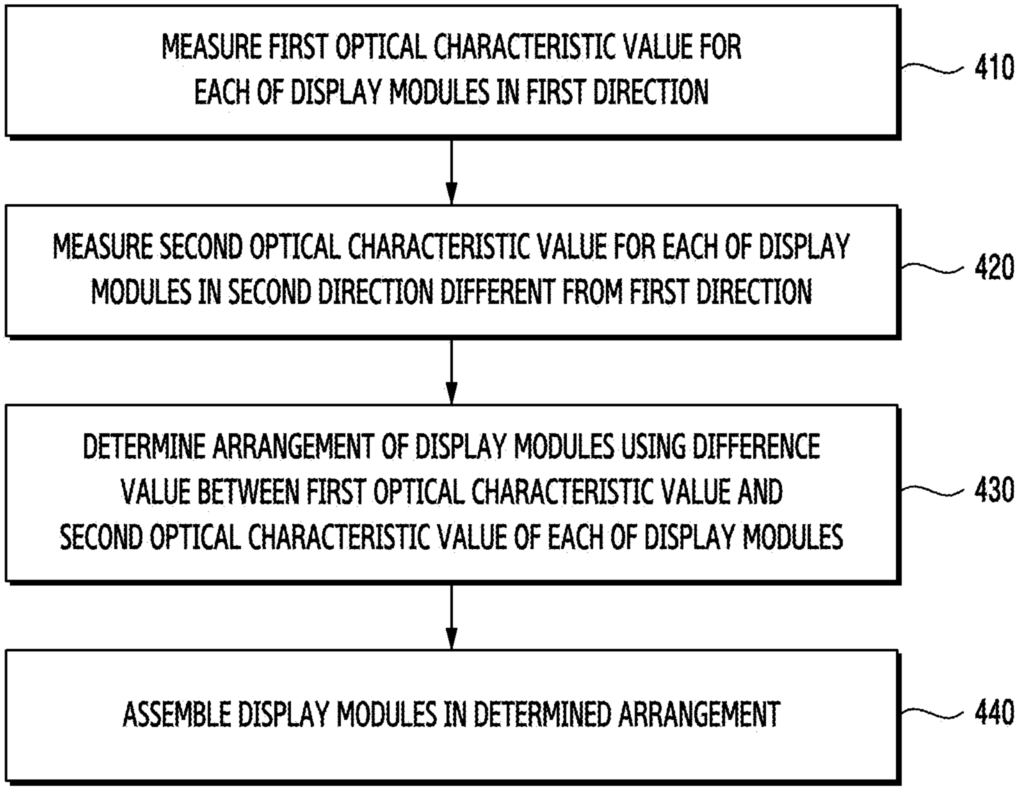
FIG. 4 is a flowchart illustrating an example manufacturing method of a modular display device, according to various embodiments.

FIG. 4 is a flowchart illustrating an example manufacturing method of a modular display device, according to various embodiments.

Referring to FIG. 4, in step 410, a first optical characteristic value for each display module may be measured in a first direction. For example, referring to FIG. 3, the first optical characteristic value of the display module 10 displaying the reference image may be measured in a first direction D1.

In step 420, a second optical characteristic value for each of the display modules may be measured in a second direction different from the first direction. For example, referring to FIG. 3, the second optical characteristic value of the display module 10 displaying the reference image may be measured in a second direction D2. Although the step 420 is illustrated to be performed after the step 410, unlike the illustration, the step 420 may be performed substantially simultaneously with the step 410 or before the step 410.

In step 430, an arrangement of the display modules may be determined using a difference value between the first optical characteristic value and the second optical characteristic value of each of the display modules. For example, the arrangement of the plurality of display modules may be determined such that the difference value between the first optical characteristic value and the second optical characteristic value for each of the plurality of display modules of the modular display device 1 gradually changes.

In step 440, the display modules may be assembled in the determined arrangement. For example, the display modules may be assembled to have the arrangement determined in the step 430.

Figure 5:
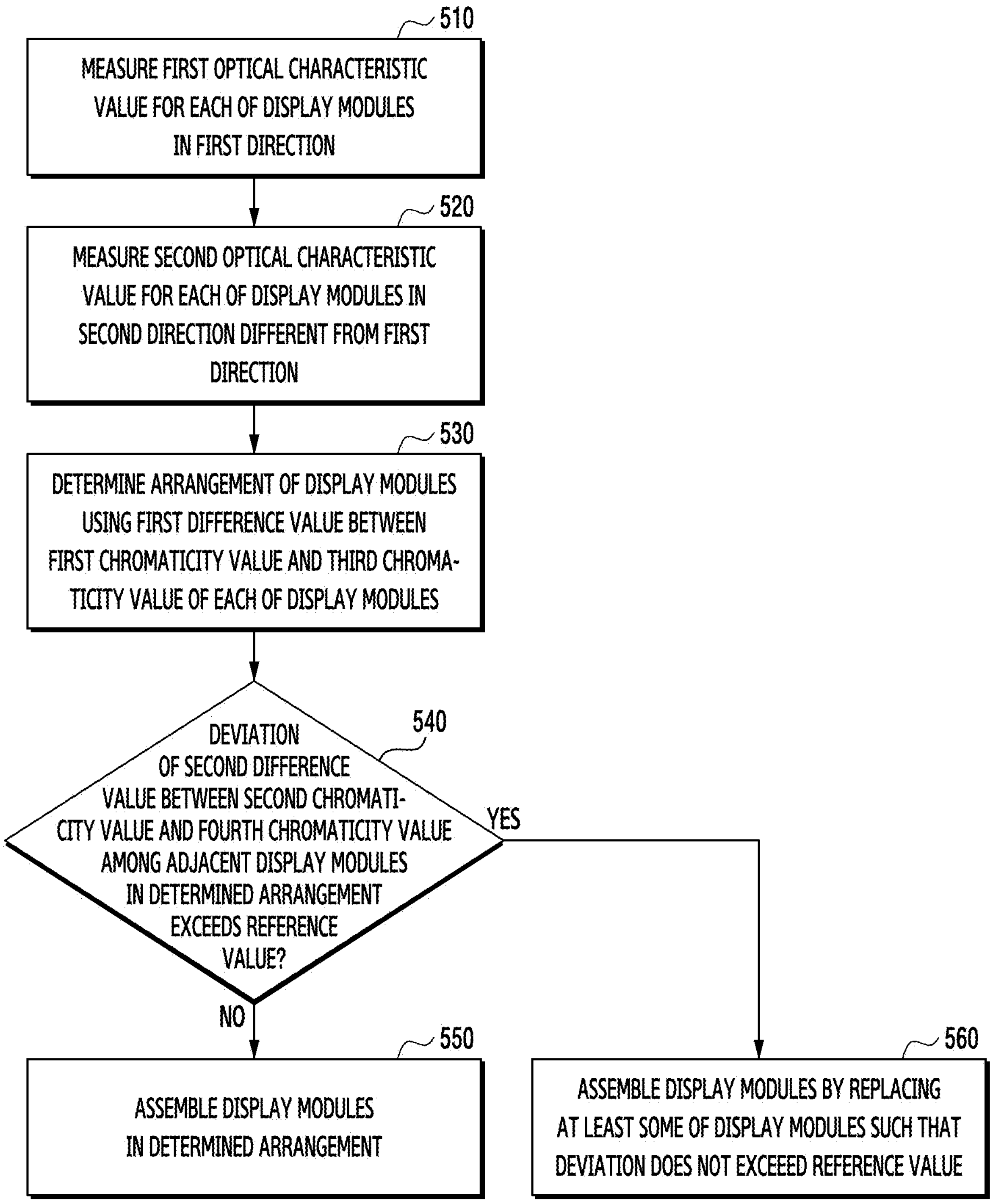
FIG. 5 is a flowchart illustrating an example manufacturing method of a modular display device, according to various embodiments.

FIG. 5 is a flowchart illustrating an example manufacturing method of a modular display device, according to various embodiments.

Referring to FIG. 5, in step 510, a first optical characteristic value for each display module may be measured in a first direction. In step 510, the first optical characteristic value may include a first chromaticity value along a first axis (e.g., a y-axis) and a second chromaticity value along a second axis (e.g., an x-axis) of a color coordinate system. For example, referring to FIG. 3, the first chromaticity value and the second chromaticity value of a display module 10 displaying the reference image may be measured in a first direction D1.

In step 520, a second optical characteristic value for each of the display modules may be measured in a second direction different from the first direction. In the step 520, the second optical characteristic value may include a third chromaticity value along the first axis (e.g., the y-axis) of the color coordinate system and a fourth chromaticity value along the second axis (e.g., the x-axis) of the color coordinate system. For example, referring to FIG. 3, the third chromaticity value and the fourth chromaticity value of the display module 10 displaying the reference image may be measured in a second direction D2. Although the step 520 is illustrated to be performed after the step 510, the step 520 may be performed substantially simultaneously with the step 510 or before the step 510.

In step 530, an arrangement of the display modules may be determined using a first difference value between the first chromaticity value and the third chromaticity value of each of the display modules. For example, the arrangement of the plurality of display modules of a modular display device 1 may be determined such that the difference value between the first chromaticity value and the third chromaticity value of each of the plurality of display modules gradually changes.

In step 540, it may be determined whether a deviation of a second difference value between the second chromaticity value and the fourth chromaticity value among adjacent display modules within the determined arrangement exceeds a reference value. For example, referring to FIG. 1, it may be determined whether the deviation between the second difference value of a display module 11 and the second difference value of a display module 12, adjacent to the display module 11, exceeds the reference value. In the step 540, if it is determined that the deviation of the second difference value does not exceed the reference value (the step 540: NO), step 550 may be performed, and if not (the step 540: YES), step 560 may be performed.

In step 550, the display modules may be assembled in the determined arrangement. For example, the display modules may be assembled to have the arrangement determined in the step 530.

In step 560, the display modules may be assembled by replacing at least some of the display modules such that the deviation does not exceed the reference value. For example, if it is determined in the step 540 that the deviation between the second difference value of the display module 11 and the second difference value of the display module 12, adjacent to the display module 11, exceeds the reference value, then in the step 560, the display modules may be assembled after replacing the display module 11 and/or the display module 12 with other display modules such that the reference value is not exceeded.

Figure 6:
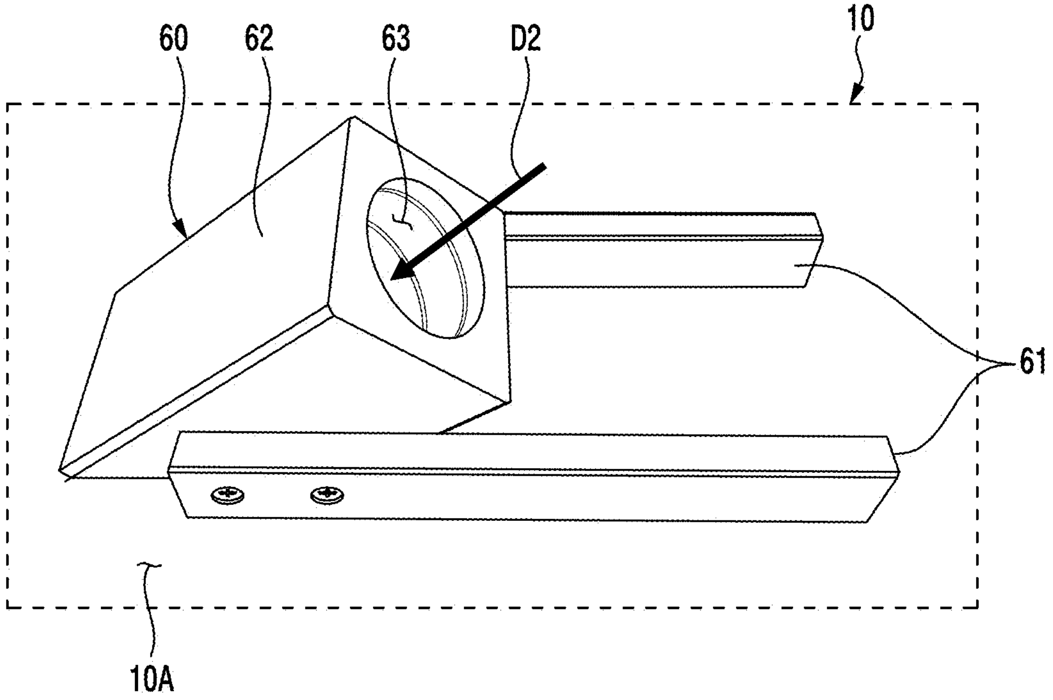
FIG. 6 is a perspective view illustrating an example jig for measuring an optical characteristic, according to various embodiments.

FIG. 6 is a perspective view illustrating an example jig for measuring an optical characteristic, according to various embodiments. In FIG. 6, a jig 60 used for measuring the second optical characteristic in the second direction D2, as described above, is illustrated.

Referring to FIG. 6, the jig 60 may include a base 61 and a bracket 62 coupled to the base 61. A barrel 63 may be formed in the bracket 62. The base 61 may be attached to a front surface 10A of a display module 10. Although not illustrated, a measurement instrument may be attached to the bracket 62 of the jig 60 so as to receive light through the barrel 63. In a state in which the base 61 is attached to the display module 10, the measurement instrument attached to the bracket 62 may view the front surface 10A of the display module 10 in the second direction D2 through the barrel 63. Light emitted from the display module 10 may be transmitted to the measurement instrument through the barrel 63. Accordingly, the measurement instrument may measure the second optical characteristic in the second direction D2. The measurement instrument may include a colorimeter or a luminance meter capable of measuring chromaticity (e.g., when the second optical characteristic includes a chromaticity value).

Figure 7A:
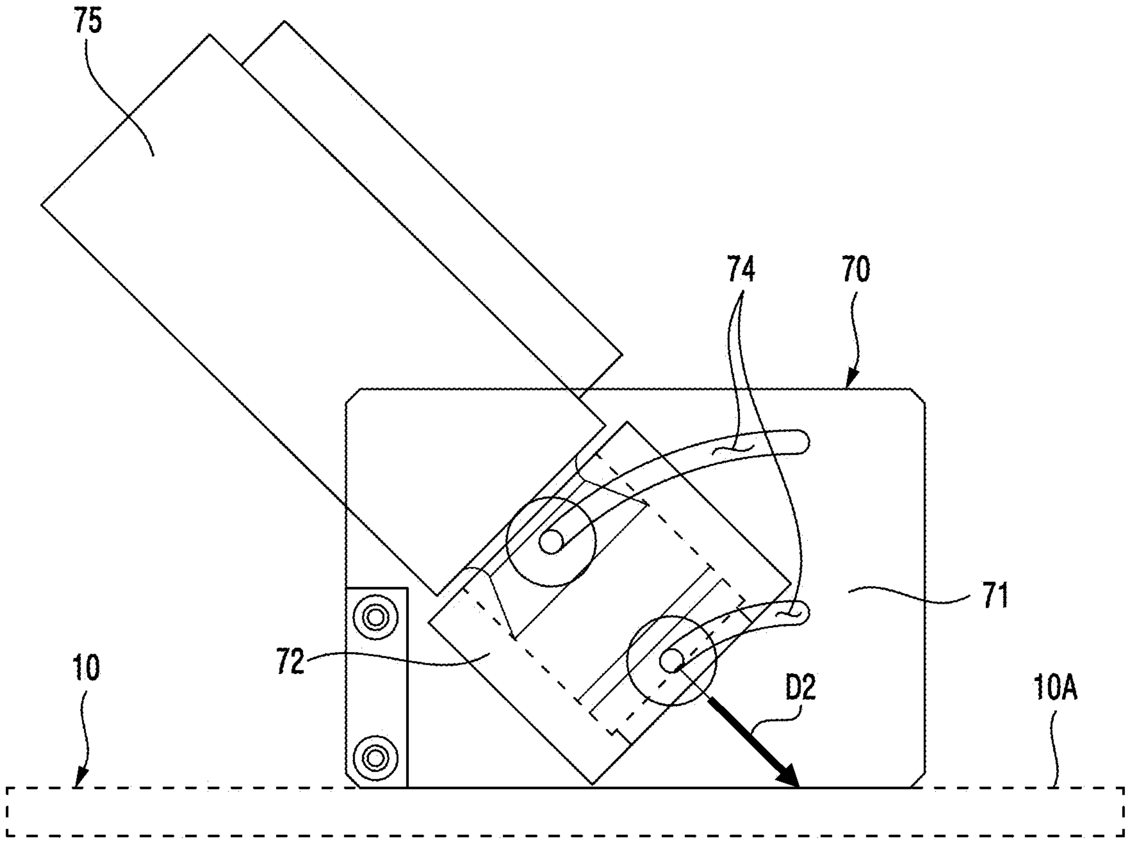
FIGS. 7A, 7B, and 7C are diagrams illustrating an example jig for measuring an optical characteristic, according to various embodiments.
Figure 7B:
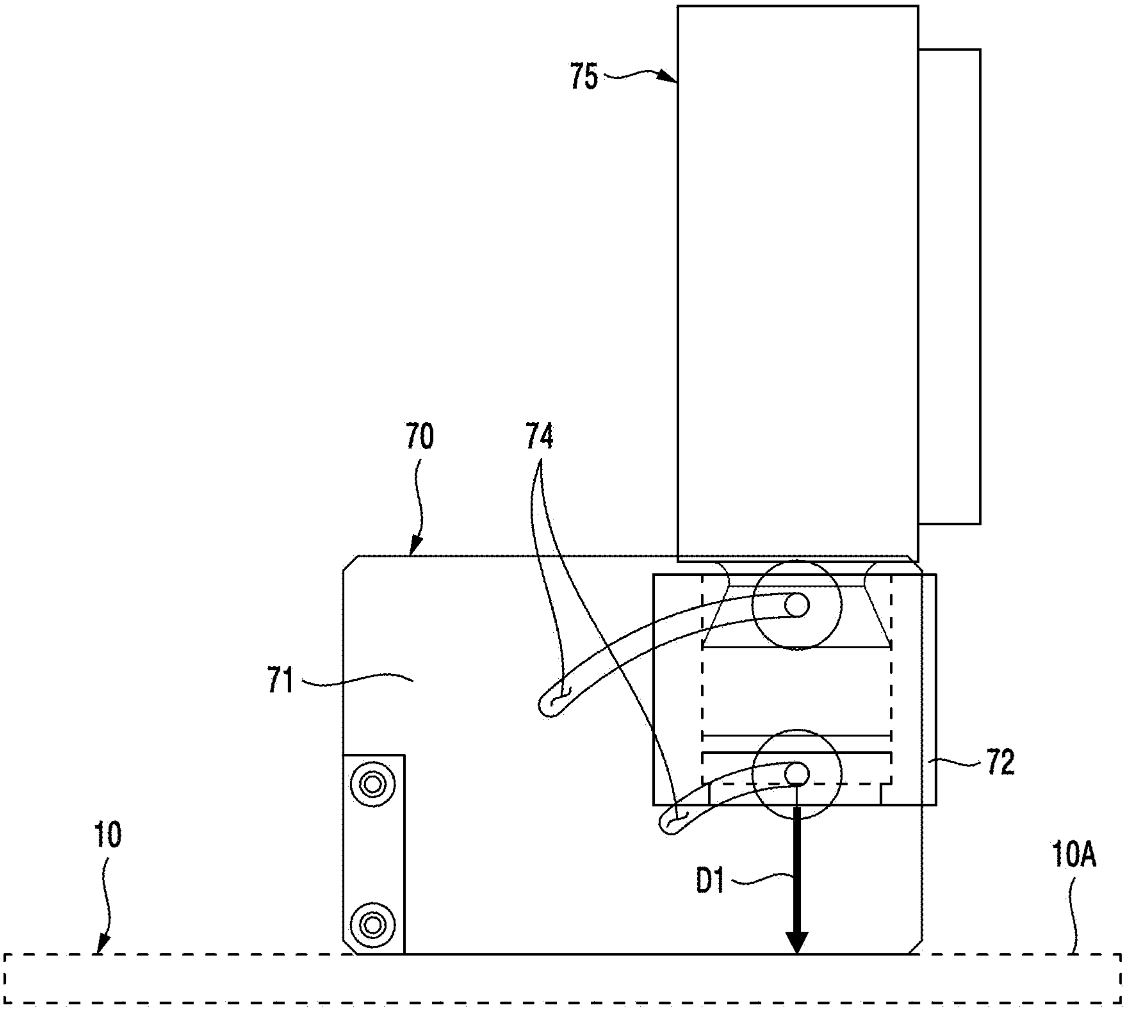
Figure 7C:
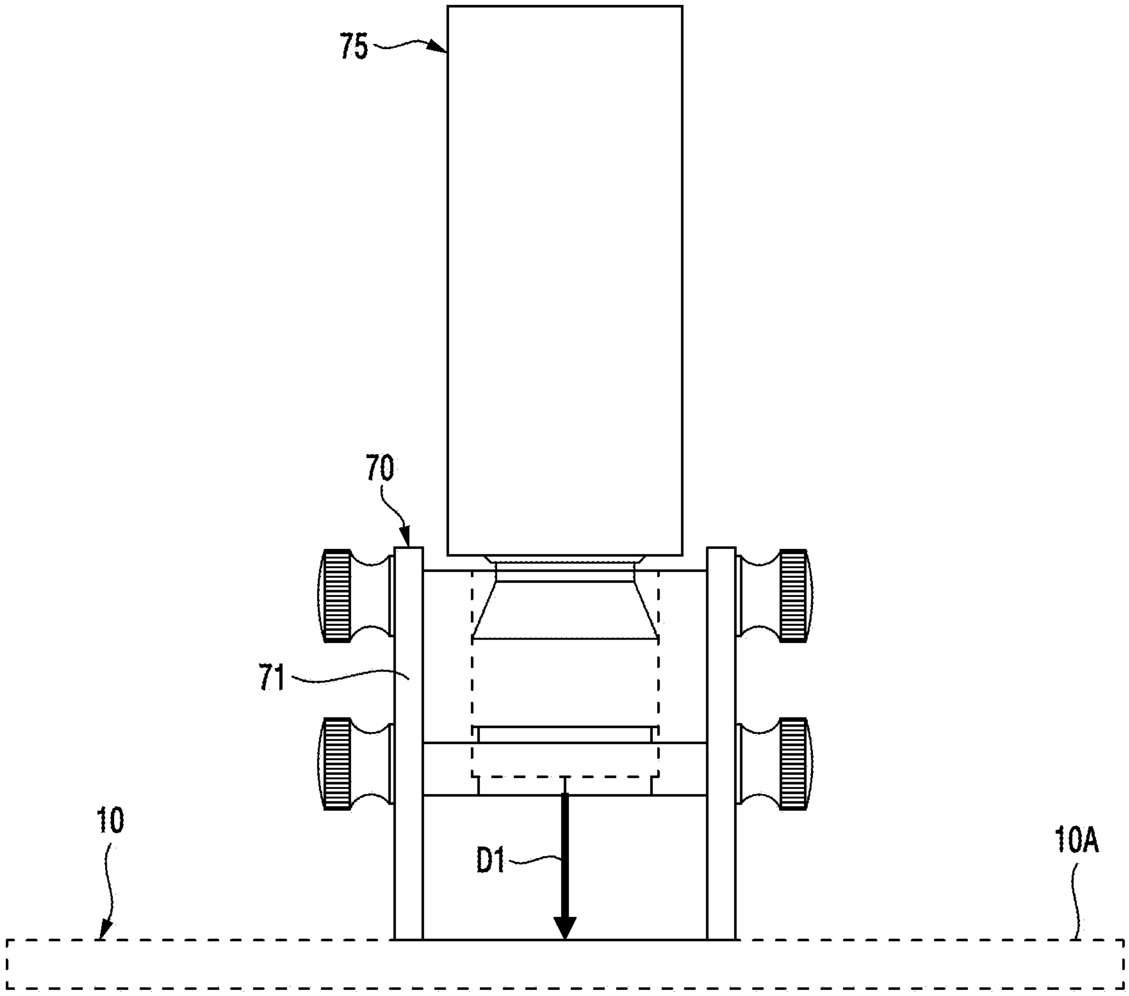

FIGS. 7A, 7B, and 7C are diagrams illustrating an example jig for measuring an optical characteristic, according to various embodiments. In FIGS. 7A, 7B, and 7C, a jig 70 used for measuring the first optical characteristic in the first direction D1 and the second optical characteristic in the second direction D2, as described above, is illustrated.

Referring to FIGS. 7A, 7B, and 7C, the jig 70 may include a base 71 and a bracket 72 coupled to the base 71. A measurement instrument 75 may be attached to the bracket 72.

For example, the bracket 72 may be fixed to the base 71 via a fastening member such as a screw. When the fastening member is loosened, the bracket 72 may move along guide rails 74 formed on the base 71. Accordingly, the bracket 72 and the measurement instrument 75 attached to the bracket 72 may be arranged at various angles with respect to the base 71.

The base 71 may be attached to a front surface 10A of a display module 10. For example, referring to FIG. 7A, in a state in which the base 71 is attached to the display module 10, the bracket 72 may be arranged at a first angle with respect to the base 71, and the measurement instrument 75 attached to the bracket 72 may view the front surface 10A of the display module 10 in the second direction D2. Accordingly, the second optical characteristic in the second direction D2 may be measured.

Referring to FIG. 7B, in a state in which the base 71 is attached to the display module 10, the bracket 72 may be arranged at a second angle different from the first angle with respect to the base 71, and the measurement instrument 75 attached to the bracket 72 may view the front surface 10A of the display module 10 in the first direction D1. Accordingly, the first optical characteristic in the first direction D1 may be measured.

The measurement instrument 75 may include a colorimeter or a luminance meter capable of measuring chromaticity (e.g., when the first optical characteristic and the second optical characteristic include chromaticity values).

Various example embodiments of the present disclosure are described below.

According to a an example first embodiment, a modular display device 1 may comprise a plurality of display modules. The plurality of display modules may be arranged such that a difference value between a first optical characteristic value and a second optical characteristic value for each of the plurality of display modules changes gradually. The first optical characteristic value may be measured when each of the plurality of display modules displaying a reference image is viewed in a first direction D1. The second optical characteristic value may be measured when each of the plurality of display modules displaying the reference image is viewed in a second direction D2 different from the first direction D1.

In an example second embodiment, according to the first embodiment, an angle between the first direction D1 and the second direction D2 may be equal to or greater than 45 degrees and less than 90 degrees.

In an example third embodiment, according to the first embodiment or the second embodiment, the first direction D1 may be perpendicular to a screen 10A of each of the plurality of display modules displaying the reference image.

In an example fourth embodiment, according to the third embodiment, the second direction D2 may face the screen 10A of each of the plurality of display modules and may be inclined with respect to the first direction D1.

In an example fifth embodiment, according to any one of the first embodiment to the fourth embodiment, the first optical characteristic value and the second optical characteristic value may include a chromaticity value.

In an example sixth embodiment, according to the fifth embodiment, the first optical characteristic value and the second optical characteristic value may include a chromaticity value of white.

In an example seventh embodiment, according to the fifth embodiment or the sixth embodiment, the first optical characteristic value and the second optical characteristic value may include a chromaticity value of green.

In an example eighth embodiment, according to any one of the first embodiment to the seventh embodiment, the first optical characteristic value and the second optical characteristic value may include a luminance value.

In an example ninth embodiment, according to any one of the first embodiment to the eighth embodiment, the plurality of display modules may include a first set of display modules arranged in sequence along a first specific direction. The first set of display modules may include first and second display modules positioned at opposite ends of the first specific direction, and a third display module positioned between the first and second display modules. The difference value of the third display module may be greater than the difference value of the first display module and less than the difference value of the second display module.

For example, the first set of display modules may include display modules 11, 12, 13, and 14 arranged in sequence along a first direction d1, the first display module may be the display module 11, the second display module may be the display module 14, and the third display module may be the display module 12 and/or 13.

For example, the first set of display modules may include display modules 41, 31, 21, and 11 arranged in sequence along a second direction d2, the first display module may be the display module 41, the second display module may be the display module 11, and the third display module may be the display module 31 and/or 21.

For example, the first set of display modules may include display modules 41, 32, 23, and 14) arranged in sequence along a third direction d3, the first display module may be the display module 41, the second display module may be the display module 14, and the third display module may be the display module 32 and/or 23.

In an example tenth embodiment, according to the ninth embodiment, the plurality of display modules may have a matrix arrangement, and the first specific direction may be a diagonal direction of the matrix arrangement. For example, the first specific direction may be the third direction d3.

In an example eleventh embodiment, according to any one of the first embodiment to the tenth embodiment, the plurality of display modules may include a fourth display module, a fifth display module, and a sixth display module, which are arranged in sequence along a second specific direction and are adjacent to each other. The difference value of the fifth display module may be greater than the difference value of the fourth display module and the difference value of the sixth display module.

In an example twelfth embodiment, according to the eleventh embodiment, the first specific direction may be parallel to the second specific direction. For example, the first set of display modules may include display modules 11, 12, 13, and 14 arranged in sequence along the first direction d1, and in this case, the fourth display module, the fifth display module, and the sixth display module may be display modules 21, 22, 23; 22, 23, 24; 31, 32, 33; 32, 33, 34; 41, 42, 43; and 42, 43, 44 arranged in sequence along the first direction d1.

For example, the first set of display modules may include display modules 41, 31, 21, and 11 arranged in sequence along the second direction d2, and in this case, the fourth display module, the fifth display module, and the sixth display module may include display modules 42, 32, 22; 32, 22, 12; 43, 33, 23; 33, 23, 13; 44, 34, 24; and 34, 24, 14 arranged in sequence along the second direction d2.

For example, the first set of display modules may include display modules 41, 32, 23, and 14 arranged in sequence along the third direction d3, and in this case, the fourth display module, the fifth display module, and the sixth display module may include display modules 31, 22, 13; and 42, 33, 24.

In an example thirteenth embodiment, according to the eleventh embodiment, the first specific direction may be different from the second specific direction. The fourth display module, the fifth display module, or the sixth display module may be included in the first set of display modules. For example, if the first specific direction is the first direction d1, the second specific direction may be the second direction d2 or the third direction d3. For another example, if the first specific direction is the second direction d2, the second specific direction may be the first direction d1 or the third direction d3. For another example, if the first specific direction is the third direction d3, the second specific direction may be the first direction d1 or the second direction d2.

For example, if the first specific direction is the first direction d1 and the second specific direction is the second direction d2, the first set of display modules may include display modules 11, 12, and 13, and the fourth display module, the fifth display module, and the sixth display module, respectively, may be the display modules 32, 22, and 12.

For example, if the first specific direction is the first direction d1 and the second specific direction is the third direction d3, the first set of display modules may include the display modules 11, 12, and 13, and the fourth display module, the fifth display module, and the sixth display module, respectively, may be the display modules 31, 22, and 13.

For example, if the first specific direction is the second direction d2 and the second specific direction is the first direction d1, the first set of display modules may include the display modules 32, 22, and 12, and the fourth display module, the fifth display module, and the sixth display module, respectively, may be the display modules 11, 12, and 13.

For example, if the first specific direction is the second direction d2 and the second specific direction is the third direction d3, the first set of display modules may include the display modules 32, 22, and 12, and the fourth display module, the fifth display module, and the sixth display module, respectively, may be display modules 31, 22, and 13.

For example, if the first specific direction is the third direction d3 and the second specific direction is the first direction d1, the first set of display modules may include display modules 41, 32, 23, and 14, and the fourth display module, the fifth display module, and the sixth display module, respectively, may be the display modules 31, 32, and 33.

For example, if the first specific direction is the third direction d3 and the second specific direction is the second direction d2, the first set of display modules may include the display modules 41, 32, 23, and 14, and the fourth display module, the fifth display module, and the sixth display module, respectively, may be the display modules 42, 32, and 22.

In an example fourteenth embodiment, according to any one of the first embodiment to the thirteenth embodiment, the plurality of display modules may include a seventh display module, an eighth display module, and a ninth display module, which are arranged in sequence along a third specific direction and are adjacent to each other. The difference value of the eighth display module may be less than the difference value of the seventh display module and the difference value of the ninth display module. For example, the third specific direction may be the first direction d1, the second direction d2, or the third direction d3.

According to an example fifteenth embodiment, a method of manufacturing a modular display device 1 including a plurality of display modules may comprise measuring 410 or 510, in a first direction D1, a first optical characteristic value for each of the plurality of display modules displaying a reference image, measuring 420 or 520, in a second direction D2 different from the first direction D1, a second optical characteristic value for each of the plurality of display modules displaying the reference image, determining 430 or 530 an arrangement of the plurality of display modules such that a difference value between the first optical characteristic value and the second optical characteristic value for each of the plurality of display modules gradually changes, and assembling 440 or 550 the plurality of display modules in the determined arrangement.

In an example sixteenth embodiment, according to the fifteenth embodiment, the first optical characteristic value may include a first chromaticity value of a designated color along a first axis of a color coordinate system. The second optical characteristic value may include a second chromaticity value of the designated color along the first axis of the color coordinate system.

In an example seventeenth embodiment, according to the sixteenth embodiment, the first optical characteristic value may include a third chromaticity value of the designated color along a second axis of the color coordinate system. The second optical characteristic value may include a fourth chromaticity value of the designated color along the second axis of the color coordinate system. The method or manufacturing may further comprise determining an arrangement of the plurality of display modules such that a respective first difference value between the first and second chromaticity values for each of the plurality of display modules gradually changes 530, determining whether a deviation of a respective second difference value between the third and fourth chromaticity values among adjacent display modules within the determined arrangement exceeds a reference value 540, and assembling the display modules in the determined arrangement if the deviation does not exceed the reference value 550.

In an example eighteenth embodiment, according to the seventeenth embodiment, the method of manufacturing may further comprise replacing at least some of the display modules determined to exceed the reference value with other display modules for assembly 560, if the deviation exceeds the reference value.

In an example nineteenth embodiment, according to any one of the fifteenth embodiment to the eighteenth embodiment, the first direction D1 may be perpendicular to a screen 10A of each of the plurality of display modules displaying the reference image.

In an example twentieth embodiment, according to any one of the fifteenth embodiment to the nineteenth embodiment, the second direction D2 may face the screen 10A of each of the plurality of display modules and may be inclined with respect to the first direction D1.

Although the present disclosure has been illustrated and described above with reference to various example embodiments, it will be understood by those of ordinary skill in the art that various changes in form and details may be made without departing from the spirit and scope of the present disclosure including the appended claims and their equivalents. It will also be understood that any of the embodiment(s) described herein may be used in conjunction with any other embodiment(s) described herein.

What is claimed is:

1. A modular display device comprising:

a plurality of display modules, wherein the display modules are arranged such that a respective difference between a first optical characteristic value and a second optical characteristic value for each of the display modules changes at a specified rate or less, wherein the first optical characteristic value is measured when each of the display modules displaying a reference image is viewed in a first direction, and wherein the second optical characteristic value is measured when each of the display modules displaying the reference image is viewed in a second direction different from the first direction.

2. The modular display device according to claim 1, wherein an angle between the first direction and the second direction is equal to or greater than 45 degrees and less than 90 degrees.

3. The modular display device according to claim 1, wherein the first direction is perpendicular to a screen of each of the display modules displaying the reference image.

4. The modular display device according to claim 3, wherein the second direction faces the screen of each of the display modules and is inclined with respect to the first direction.

5. The modular display device according to claim 1, wherein the first optical characteristic value and the second optical characteristic value include a chromaticity value.

6. The modular display device according to claim 5, wherein the first optical characteristic value and the second optical characteristic value include a chromaticity value of white.

7. The modular display device according to claim 5, wherein the first optical characteristic value and the second optical characteristic value include a chromaticity value of green.

8. The modular display device according to claim 1, wherein the first optical characteristic value and the second optical characteristic value include a luminance value.

9. The modular display device according to claim 1, wherein the display modules include a first set of display modules arranged in sequence along a first specific direction, the first set of display modules including:

first and second display modules positioned at opposite ends of the first specific direction, and a third display module positioned between the first and second display modules, and wherein a difference of first and second optical characteristic values of the third display module is greater than the difference of the first and second optical characteristic values of the first display module and less than the difference of the first and second optical characteristic values of the second display module.

10. The modular display device according to claim 9, wherein the display modules have a matrix arrangement, and wherein the first specific direction is a diagonal direction of the matrix arrangement.

11. The modular display device according to claim 10, wherein the display modules include fourth, fifth, and sixth display modules arranged in sequence along a second specific direction and adjacent to each other, and wherein a difference of first and second optical characteristic values of the fifth display module is greater than a difference of first and second optical characteristic values of the fourth display module and a difference of first and second optical characteristic values of the sixth display module.

12. The modular display device according to claim 11, wherein the first specific direction is parallel to the second specific direction.

13. The modular display device according to claim 11, wherein the first specific direction is different from the second specific direction, and wherein the fourth display module, the fifth display module, or the sixth display module is included in the first set of display modules.

14. The modular display device according to claim 1, wherein the display modules include seventh, eighth, and ninth display modules, arranged in sequence along a third specific direction and adjacent to each other, and wherein a difference of first and second optical characteristic values of the eighth display module is less than a difference of first and second optical characteristic values of the seventh display module and a difference of first and second optical characteristic values of the ninth display module.

15. A method of manufacturing a modular display device including a plurality of display modules, the method comprising:

measuring, in a first direction, a first optical characteristic value for each of the display modules displaying a reference image;

measuring, in a second direction different from the first direction, a second optical characteristic value for each of the display modules displaying the reference image;

determining an arrangement of the display modules such that a respective difference between the first optical characteristic value and the second optical characteristic value for each of the display modules changes at a specified rate or less; and assembling the display modules based on the determined arrangement.

16. The method of manufacturing according to claim 15, wherein the first optical characteristic value includes a first chromaticity value of a designated color along a first axis of a color coordinate system, and wherein the second optical characteristic value includes a second chromaticity value of the designated color along the first axis of the color coordinate system.

17. The method of manufacturing according to claim 16, wherein the first optical characteristic value includes a third chromaticity value of the designated color along a second axis of the color coordinate system, and wherein the second optical characteristic value includes a fourth chromaticity value of the designated color along the second axis of the color coordinate system, the method of manufacturing further comprising:

determining an arrangement of the display modules such that a respective first difference between the first and second chromaticity values for each of the display modules changes at a specified rate or less;

determining whether a deviation of a respective second difference between the third and fourth chromaticity values among adjacent display modules within the determined arrangement exceeds a reference value; and assembling the display modules in the determined arrangement based on the deviation not exceeding the reference value.

18. The method of manufacturing according to claim 17, further comprising replacing at least some of the display modules determined to exceed the reference value with other display modules for assembly based on the deviation exceeding the reference value.

19. The method of manufacturing according to claim 15, wherein the first direction is perpendicular to a screen of each of the display modules displaying the reference image.

20. The method of manufacturing according to claim 19, wherein the second direction faces the screen of each of the display modules and is inclined with respect to the first direction.

* * * * *